(12) United States Patent
Kashu et al.

(10) Patent No.: US 11,892,316 B2
(45) Date of Patent: Feb. 6, 2024

(54) MAP INFORMATION ASSESSMENT DEVICE, MEDIUM STORING COMPUTER PROGRAM FOR MAP INFORMATION ASSESSMENT, AND MAP INFORMATION ASSESSMENT METHOD

(71) Applicants: TOYOTA JIDOSHA KABUSHIKI KAISHA, Toyota (JP); DENSO CORPORATION, Kariya (JP)

(72) Inventors: Takao Kashu, Tokyo (JP); Hiroaki Sakakibara, Tokyo (JP); Yasutaka Teramae, Kawasaki (JP); Hiroki Ukai, Kariya (JP); Masahiro Goto, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 32 days.

(21) Appl. No.: 17/706,091

(22) Filed: Mar. 28, 2022

(65) Prior Publication Data
US 2022/0316912 A1 Oct. 6, 2022

(30) Foreign Application Priority Data
Mar. 30, 2021 (JP) .................. 2021-058281

(51) Int. Cl.
*G01C 21/30* (2006.01)
*B60W 60/00* (2020.01)
(Continued)

(52) U.S. Cl.
CPC ......... *G01C 21/3815* (2020.08); *B60W 50/14* (2013.01); *B60W 60/00* (2020.02)

(58) Field of Classification Search
CPC .... B60W 50/14; B60W 60/00; G01C 21/3815
See application file for complete search history.

(56) References Cited

U.S. PATENT DOCUMENTS

| 6,542,816 B1 * | 4/2003 | Ito ...................... G01C 21/3896 |
| | | 701/428 |
| 2003/0088344 A1 | 5/2003 | Oda et al. |

(Continued)

FOREIGN PATENT DOCUMENTS

| JP | 3980868 B2 | 9/2007 |
| JP | 2016-200472 A | 12/2016 |
| JP | 2018-179675 A | 11/2018 |

*Primary Examiner* — Tyler J Lee
(74) *Attorney, Agent, or Firm* — Sughrue Mion, PLLC

(57) ABSTRACT

A map information assessment device has a processor configured to detect the end road zone located furthest on the destination location side, among the multiple road zones on the navigation route, to determine whether or not the end road zone is connected to another road zone on the destination location side, to detect the end road link on the navigation route which is associated with the end road zone when the end road zone is connected with another road zone on the destination location side, and to determine whether or not the end road link is connected with another road link representing the navigation route, which is not associated with the road zone on the destination location side, and to attach a predetermined attribute to the end road zone when the end road link is connected with another road link representing the navigation route.

5 Claims, 10 Drawing Sheets

(51) Int. Cl.
  *B60W 50/14* (2020.01)
  *G01C 21/00* (2006.01)

(56) References Cited

U.S. PATENT DOCUMENTS

| | | | |
|---|---|---|---|
| 2009/0125235 A1* | 5/2009 | Chen | G01C 21/3848 |
| | | | 701/414 |
| 2013/0013194 A1* | 1/2013 | Tsutsumi | G01C 21/3837 |
| | | | 701/430 |
| 2020/0033138 A1 | 1/2020 | Okoba et al. | |
| 2020/0191576 A1* | 6/2020 | Zhang | G01C 21/3691 |
| 2021/0381847 A1* | 12/2021 | Cajias | G09B 29/106 |

* cited by examiner

MAP INFORMATION ASSESSMENT DEVICE, MEDIUM STORING COMPUTER PROGRAM FOR MAP INFORMATION ASSESSMENT, AND MAP INFORMATION ASSESSMENT METHOD

FIELD

The present disclosure relates to a map information assessment device, to a medium storing a computer program for map information assessment, and to map information assessment method.

BACKGROUND

An automatic control device mounted in a vehicle creates a navigation route for the vehicle based on the current location of the vehicle, the destination location of the vehicle, and a navigation map. The automatic control device estimates the current location of the vehicle using a location-estimating map, and controls the vehicle to travel along the navigation route.

For example, Japanese Unexamined Patent Publication No. 2018-179675 proposes a navigation device that carries out processing for path finding and vehicle control in a coordinated manner by matching positional information for nodes on a route in map data for route searching (a navigation map), with intersection regions that include intersecting polygons representing intersection shapes, in map data for vehicle control (a location-estimating map).

SUMMARY

Due to differences in the timing in which the map information is updated, however, in some cases the road information in the navigation map may fail to match the road information in the location-estimating map. When a new road has been constructed, for example, it may be the case that the road is included in the navigation map but is not included in the location-estimating map.

When a navigation route on the navigation map includes a branching location where another road not present in the location-estimating map branches from a road in the location-estimating map, the automatic control device may not recognize the branching location. As a result the automatic control device may control the vehicle to continue traveling on the road in the location-estimating map, causing the vehicle to deviate from the navigation route.

It is therefore an object of the present disclosure to provide a map information assessment device that can recognize branching locations even when a navigation route in a navigation map branches from a road in a location-estimating map to another road not in the location-estimating map, by attaching a predetermined attribute to an end road zone among multiple road zones representing roads in the location-estimating map.

According to one embodiment of the invention there is provided a map information assessment device. The map information assessment device is capable of executing associative processing between information for multiple road links representing a vehicle navigation route that has been generated on a navigation map based on a current location and destination location of a vehicle, and information for multiple road zones representing roads represented in a location-estimating map used for estimating the location of the vehicle and the map information assessment device includes a road zone detecting unit that detects an end road zone located furthest on the destination location side among the multiple road zones on the navigation route a first assessment unit that determines whether or not the end road zone is connected with another road zone on the destination location side a road link detecting unit that detects an end road link on the navigation route that is associated with the end road zone when the end road zone is connected with another road zone on the destination location side a second assessment unit that determines whether or not the end road link is connected with another road link representing the navigation route that is not associated with the road zone on the destination location side and an attribute attaching unit that attaches a predetermined attribute to the end road zone when the end road link is connected with another road link representing the navigation route.

This map information assessment device preferably also has a notification control unit that, when the vehicle has approached within a predetermined distance to the end road zone having the attached predetermined attribute, gives the driver a notification via a notifying unit of information indicating that the vehicle has approached within the predetermined distance of the end road zone.

In this map information assessment device, the predetermined attribute preferably indicates that the end road zone is the last road zone where the location of the vehicle can be estimated using the location-estimating map, for traveling of the vehicle along the navigation route.

The attribute attaching unit in the map information assessment device also preferably attaches an attribute to the end road zone indicating that the end road zone includes the destination location of the vehicle, when the end road link is not connected to another road link.

According to another embodiment there is provided a computer program for map information assessment. The computer program for map information assessment is capable of executing associative processing between information for multiple road links representing a vehicle navigation route that has been generated on a navigation map based on a current location and destination location of a vehicle, and information for multiple road zones representing roads represented in a location-estimating map used for estimating a location of the vehicle, and it causes a processor to execute a process and the process includes detecting an end road zone located furthest on the destination location side among the multiple road zones on the navigation route, determining whether or not the end road zone is connected with another road zone on the destination location side, detecting an end road link on the navigation route that is associated with the end road zone when the end road zone is connected with another road zone on the destination location side, determining whether or not the end road link is connected with another road link representing the navigation route that is not associated with the road zone on the destination location side, and attaching a predetermined attribute to the end road zone when the end road link is connected with another road link representing the navigation route.

According to yet another embodiment of the invention there is provided a map information assessment method. The map information assessment method is carried out by a map information assessment device that is capable of executing associative processing between information for multiple road links representing a vehicle navigation route that has been generated on a navigation map based on a current location and destination location of a vehicle, and information for multiple road zones representing roads represented in a location-estimating map used for estimating a location of the vehicle, and the method includes detecting an end road zone located furthest on the destination location side among the multiple road zones on the navigation route, determining whether or not the end road zone is connected with another road zone on the destination location side, detecting an end road link on the navigation route that is associated with the end road zone when the end road zone is connected with another road zone on the destination location side, determining whether or not the end road link is connected with another road link representing the navigation route that is not associated with the road zone on the destination location side, and attaching a predetermined attribute to the end road zone when the end road link is connected with another road link representing the navigation route.

The map information assessment device of the present disclosure can recognize branching locations even when a navigation route in a navigation map branches from a road in the location-estimating map to another road not in the location-estimating map, by attaching a predetermined attribute to an end road zone.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Figure 1:
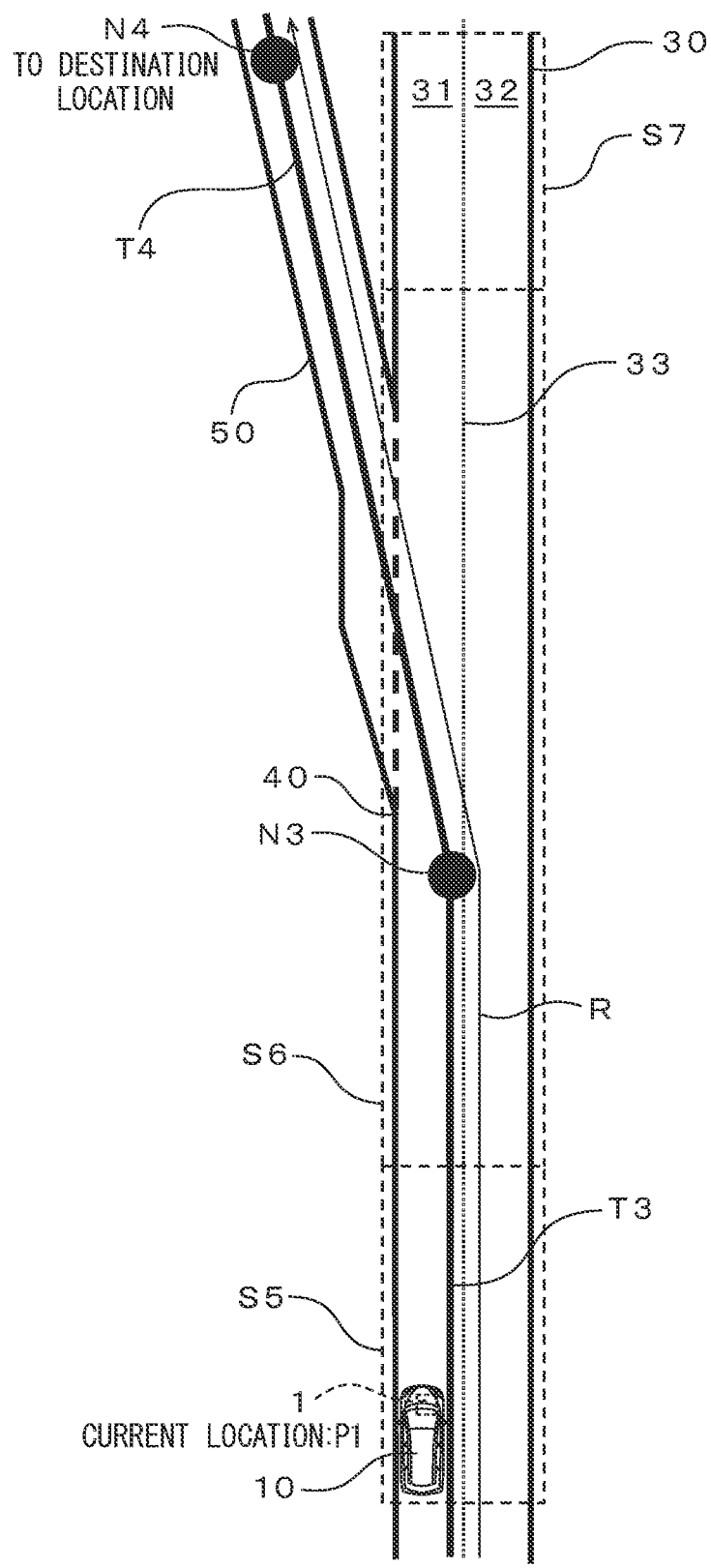
FIG. 1 is a diagram illustrating in overview the operation of a vehicle control system according to an embodiment.

FIG. 1 is a diagram illustrating in overview the operation of a vehicle control system 1 according to the embodiment. Operation relating to map information assessment processing by the vehicle control system 1 disclosed herein will now be described in overview with reference to FIG. 1.

In the example shown in FIG. 1, a vehicle 10 travels on a traffic lane 31 of a road 30 having two traffic lanes 31 and 32. The traffic lane 31 and traffic lane 32 are divided by a lane marking line 33.

The vehicle control system 1 mounted in the vehicle 10 automatically controls driving of the vehicle 10. The vehicle control system 1 generates a navigation route R for the vehicle 10, based on the current location of the vehicle 10, the destination location of the vehicle 10, and a navigation map.

FIG. 1 shows an example of a navigation route R generated by a vehicle control system 1. The vehicle 10 is traveling on a road 30 at the current location P1, and is expected to exit from a branching location 40 to a branching road 50.

In the navigation map, roads are represented as multiple road links connected by nodes. The navigation route R represents the multiple road links as being connected via the nodes. In the navigation route R, road branches are represented as one selected from among two or more road links extending from a single node.

In the example shown in FIG. 1, the navigation route R includes a branching location 40 where the road 50 branches from the road 30. At the branching location 40, the navigation route R is represented by connection between a road link T3 representing the road 30 and a road link T4 representing the road 50, via a node N3. The road link T4 is also connected with another road link representing the road 50 on the navigation route R, via a node N4.

The vehicle control system 1 estimates the current location of the vehicle 10 using the location-estimating map. The location-estimating map has high precision map information relating to the roads to be used for estimating the current location of the vehicle 10. The roads in the location-estimating map are represented as a series of multiple road zones.

In the example shown in FIG. 1, a portion of the road 30 is represented as the series of a road zone S5, a road zone S6 and a road zone S7. The road 50 branching from the road 30 is not included in the location-estimating map.

The vehicle control system 1 associates multiple road links representing the navigation route R of the vehicle 10 generated on the navigation map, with multiple road zones representing roads in the location-estimating map, thereby associating the navigation route R with the location-estimating map. The vehicle control system 1 estimates the current location of the vehicle 10 using the location-estimating map, and controls the vehicle 10 to travel along the navigation route R.

In the example shown in FIG. 1, the vehicle control system 1 associates the road link T3 with the road zone S5 and road zone S6. Since the location-estimating map does not include the road 50, the road link T4 representing the road 50 is not associated with a road zone of the location-estimating map.

After having associated the navigation route R with the road zones in the location-estimating map, the vehicle control system 1 detects the end road zone S6 located furthest on the destination location side, among multiple road zones on the navigation route R.

In order to examine whether the navigation route R branches from a road in the location-estimating map to another road not in the location-estimating map, the vehicle control system 1 determines whether or not the end road zone S6 is connected with another road zone on the destination location side.

In the example shown in FIG. 1, the end road zone S6 is connected with the road zone S7 on the destination location side, and therefore the vehicle control system 1 detects the end road link T3 on the navigation route R that is associated with the end road zone S6.

The vehicle control system 1 also determines whether or not the end road link T3 is connected with another road link representing the navigation route R, which is not associated with the road zone on the destination location side.

In the example shown in FIG. 1, the end road link T3 is connected with another road link T4 representing the navigation route R, which is not associated with the road zone on the destination location side, thus showing that the navigation route R branches from a road in the location-estimating map to another road not in the location-estimating map, at the end road link T3. The vehicle control system 1 attaches information to the end road zone S6 indicating that it is the last road zone where the location of the vehicle 10 can be estimated using the location-estimating map (also referred to as the last road zone where automatic control is possible). The information indicating that it is the last road zone where automatic control is possible is an example of a predetermined attribute. The vehicle control system 1 can recognize a branching location in the location-estimating map by attaching a predetermined attribute to the end road zone.

When the current location of the vehicle 10 has approached within a predetermined distance to the end road zone S6, the vehicle control system 1 gives notification that it cannot exit from the road 30 to the road 50 by automatic control. The vehicle control system 1 may notify the driver in this case that driving of the vehicle 10 is to be switched from automatic control to manual control, or that a request is being made for steering by hands-on manipulation. The vehicle control system 1 thus allows the vehicle 10 to exit from the road 30 to the road 50 at the branching location 40 by manual steering by the driver.

Figure 2:
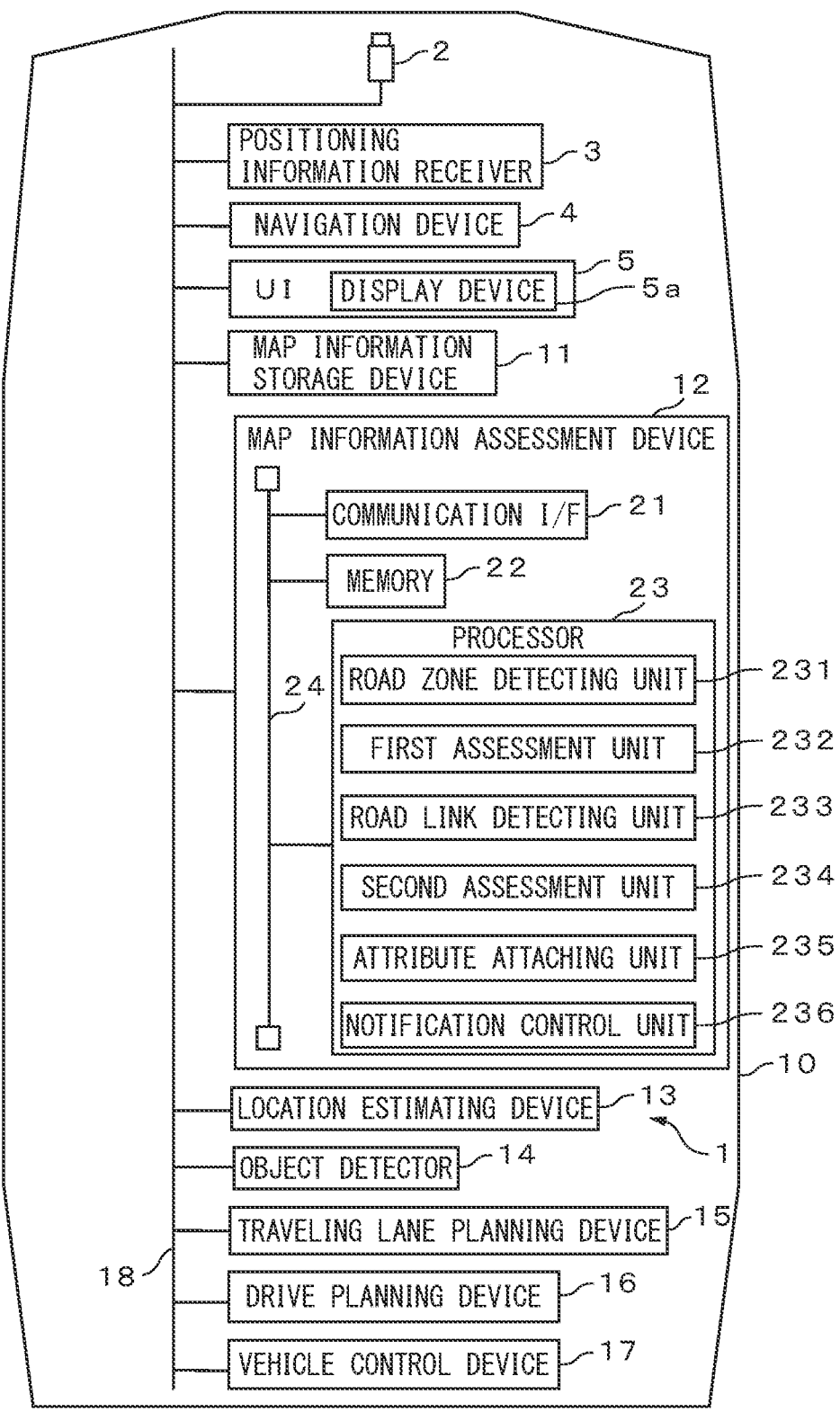
FIG. 2 is a general schematic drawing of a vehicle in which a vehicle control system of the embodiment is mounted.

FIG. 2 is a general schematic drawing of a vehicle 10 in which the vehicle control system 1 is mounted. The vehicle 10 has a camera 2, a positioning information receiver 3, a navigation device 4, a user interface (UI) 5, a map information storage device 11, a map information assessment device 12, a location estimating device 13, an object detector 14, a traveling lane planning device 15, a drive planning device 16 and a vehicle control device 17 etc. The vehicle 10 may also have a LiDAR sensor, as a distance sensor (not shown) for measurement of the distance of the vehicle 10 to surrounding objects.

The camera 2, positioning information receiver 3, navigation device 4, UI 5, map information storage device 11, map information assessment device 12, location estimating device 13, object detector 14, traveling lane planning device 15, drive planning device 16 and vehicle control device 17 are connected in a communicable manner through an in-vehicle network 18 that conforms to controller area network standards.

The camera 2 is an example of an imaging unit provided in the vehicle 10. The camera 2 is mounted inside the vehicle 10 and directed toward the front of the vehicle 10. The camera 2, for example, takes a camera image in which the environment of a predetermined region ahead of the vehicle 10 is shown, at a predetermined cycle. The camera image can show the road in the predetermined region ahead of the vehicle 10, and road features such as surface lane marking lines on the road. The camera 2 has a 2D detector composed of an array of photoelectric conversion elements with visible light sensitivity, such as a CCD or C-MOS, and an imaging optical system that forms an image of the photographed region on the 2D detector.

Each time a camera image is taken, the camera 2 outputs the camera image and the camera image photograph time at which the camera image was taken, through the in-vehicle network 18 to the location estimating device 13 and object detector 14 etc. The camera image is also used for processing at the location estimating device 13 to estimate the location of the vehicle 10. At the object detector 14, the camera image is used for processing to detect other objects surrounding the vehicle 10.

The positioning information receiver 3 outputs positioning information that represents the current location of the vehicle 10. The positioning information receiver 3 may be a GNSS receiver, for example. The positioning information receiver 3 outputs positioning information and the positioning information acquisition time at which the positioning information has been acquired, to the navigation device 4 and map information storage device 11 etc., each time positioning information is acquired at a predetermined receiving cycle.

Based on the navigation map information, the destination location of the vehicle 10 input through the UI 5, and positioning information representing the current location of the vehicle 10 input from the positioning information receiver 3, the navigation device 4 creates a navigation route R from the current location to the destination location of the vehicle 10. The navigation route R includes information relating to the locations of right turns, left turns, merging and branching. In the navigation map, roads are represented as multiple road links connected by nodes. Each of the nodes and road links is identified using identification information. The locations of the road links and nodes are represented on a world coordinate system where the origin is a predetermined location, for example. When the destination location has been newly set or the current location of the vehicle 10 has exited the navigation route R, the navigation device 4 creates a new navigation route R for the vehicle 10. Every time a navigation route R is created, the navigation device 4 outputs the navigation route R to the location estimating device 13 and map information assessment device 12 etc., via the in-vehicle network 18.

The UI 5 is an example of the notifying unit. The UI 5 is controlled by the navigation device 4, the map information assessment device 12 and vehicle control device 17 etc., and notifies the driver of traveling information for the vehicle 10, and information indicating the last road zone where automatic control is possible. The UI 5 also creates an operation signal in response to operation of the vehicle 10 by the driver. The traveling information of the vehicle 10 includes information relating to the current location of the vehicle and the current and future route of the vehicle, such as the navigation route. The UI 5 has a display device 5a such as a liquid crystal display or touch panel, for display of the traveling information. The UI 5 may also have an acoustic output device (not shown) to notify the driver of traveling information. The UI 5 also has a touch panel or operating button, for example, as an input device for inputting operation information from the driver to the vehicle 10. The operation information may be, for example, a destination location, transit points, vehicle speed or other control information for the vehicle 10. The UI 5 outputs the input operation information to the navigation device 4 and the vehicle control device 17 etc., via the in-vehicle network 18.

The map information storage device 11 stores a wide-area location-estimating map for a relatively wide area (an area of 10 to 30 km$^2$, for example) that includes the current location of the vehicle 10. The location-estimating map preferably has high precision map information including three-dimensional information for the road surface, information for the types and locations of structures and road features such as road lane marking lines, and the legal speed limit for the road. The roads are represented as a series of multiple road zones. In a terrain where multiple roads are connected, such as road branching locations, merging locations and intersections, preferably the road zones are represented with the branching locations, merging locations or intersections included in a single road zone. Each of the road zones is identified using identification information. One or more traffic lanes in a road are associated with each one of the road zones. The locations of traffic lanes and road zones in the location-estimating map are represented on a world coordinate system where the origin is a predetermined location, for example. One lane of a road may also be represented as a series of multiple road zones. In this case, each of the multiple lanes in a single zone of the road is represented by a different road zone.

The map information storage device 11 receives the wide-area map information from an external server via a base station, by wireless communication through a wireless communication device (not shown) mounted in the vehicle 10, in relation to the current location of the vehicle 10, and stores it in the storage device. The map information storage device 11 is an example of an associating unit, and it associates each of the multiple road links representing the navigation route R with corresponding road zones in the location-estimating map, every time a navigation route R is input. Association processing is described in detail below.

Each time positioning information is input from the positioning information receiver 3, the map information storage device 11 refers to the stored wide-area location-estimating map and outputs a location-estimating map for a relatively narrow area including the current location represented by the positioning information (for example, an area of 100 m$^2$ to 10 km$^2$), through the in-vehicle network 18 to the map information assessment device 12, location estimating device 13, object detector 14, traveling lane planning device 15, drive planning device 16 and vehicle control device 17 etc.

The map information assessment device 12 carries out road zone detection processing in which it detects the end road zone that is located furthest on the destination location side, among multiple road zones on the navigation route R. The map information assessment device 12 also carries out first assessment processing in which it determines whether or not the end road zone is connected to another road zone on the destination location side, and road link detection processing in which it detects the end road link on the navigation route R that is associated with the end road zone when the end road zone is connected to another road zone on the destination location side. The map information assessment device 12 also carries out second assessment processing in which it determines whether or not the end road link is connected to another road link representing the navigation route R which is not associated with the road zone on the destination location side, and attribute attachment processing in which it attaches a predetermined attribute to the end road zone when the end road link is connected to another road link representing the navigation route R. The map information assessment device 12 also carries out notification processing in which, when the vehicle 10 has approached within a predetermined distance to an end road zone having an attached predetermined attribute, it uses the UI 5 to give the driver notification of information indicating that the vehicle 10 has approached within the predetermined distance. For this purpose, the map information assessment device 12 has a communication interface (IF) 21, a memory 22 and a processor 23. The communication interface 21, memory 22 and processor 23 are connected via signal wires 24. The communication interface 21 has an interface circuit to connect the map information assessment device 12 with the in-vehicle network 18.

All or some of the functions of the map information assessment device 12 are functional modules driven by a computer program operating on the processor 23, for example. The processor 23 has a road zone detecting unit 231, a first assessment unit 232, a road link detecting unit 233, a second assessment unit 234, an attribute attaching unit 235 and a notification control unit 236. Alternatively, the functional module of the processor 23 may be a specialized computing circuit in the processor 23. The processor 23 comprises one or more CPUs (Central Processing Units) and their peripheral circuits. The processor 23 may also have other computing circuits such as a logical operation unit, numerical calculation unit or graphic processing unit. The memory 22 is an example of a memory unit, and it has a volatile semiconductor memory and a non-volatile semiconductor memory, for example. The memory 22 stores an application computer program and various data to be used for information processing carried out by the processor 23 of each device. Operation of the map information assessment device 12 will be described in detail below.

The location estimating device 13 estimates the location of the vehicle 10 at the camera image photograph time, based on the road features surrounding the vehicle 10 represented in the camera image. For example, the location estimating device 13 compares lane marking lines identified in the camera image with lane marking lines represented in the location-estimating map input from the map information storage device 11, and determines the estimated location and estimated declination of the vehicle 10 at the camera image photograph time. The location estimating device 13 estimates the road traveling lane where the vehicle 10 is located, based on the lane marking lines represented in the map information and on the estimated location and estimated declination of the vehicle 10. Each time the estimated location, estimated declination and traveling lane of the vehicle 10 are determined at the camera image photograph time, the location estimating device 13 outputs this information to the object detector 14, traveling lane planning device 15, drive planning device 16 and vehicle control device 17 etc.

The object detector 14 detects other objects around the vehicle 10 and their types (for example, vehicles) based on the camera image and reflected wave information. Other objects also include other vehicles traveling around the vehicle 10. The object detector 14 tracks other detected objects and determines the trajectories of the other objects. In addition, the object detector 14 identifies the traveling lanes in which the other objects are traveling, based on the lane marking lines represented in the map information and the locations of the objects. The object detector 14 outputs object detection information which includes information representing the types of other objects that were detected, information indicating their locations, and also information indicating their traveling lanes, to the traveling lane planning device 15 and drive planning device 16 etc.

At a traveling lane-planning creation time set in a predetermined cycle, the traveling lane planning device 15 selects a traffic lane on the road on which the vehicle 10 is traveling, within the nearest driving zone (for example, 10 km) selected from the navigation route, based on the map information, the navigation route and surrounding environment information and the current location of the vehicle 10, and creates a traveling lane plan representing the scheduled traveling lane for traveling of the vehicle 10. For example, the traveling lane planning device 15 creates a traveling lane plan for the vehicle 10 to travel on a traffic lane other than a passing traffic lane. Each time a traveling lane plan is created, the traveling lane planning device 15 outputs the drive planning device 16 of the traveling lane plan.

The traveling lane planning device 15 also determines whether or not a lane change is necessary within the nearest driving zone selected from the navigation route R, based on the map information, the navigation route R and the current location of the vehicle 10. The traveling lane planning device 15 may further utilize surrounding environment information or vehicle status information to determine whether or not a lane change is necessary. The surrounding environment information includes the locations and speeds of other vehicles traveling around the vehicle 10. The vehicle status information includes the current location of the vehicle 10, and the vehicle speed, acceleration and traveling direction. Specifically, the traveling lane planning device 15 determines whether or not a lane change is necessary for moving to a traffic lane toward the destination location of the vehicle 10, based on the navigation route R and the current location of the vehicle 10. It is determined whether or not the vehicle 10 is approaching another road that merges ahead from the traveling road on which it is currently traveling (merge), or the vehicle 10 is exiting onto another road branching out ahead from the traveling road (branch). Since merging and branching involve movement of the vehicle from a lane of the traveling road to a lane in another road, a lane change is carried out.

At a driving plan creation time set with a predetermined cycle, the drive planning device 16 carries out driving plan processing in which it creates a driving plan representing the scheduled traveling trajectory of the vehicle 10 up until a predetermined time (for example, 5 seconds), based on the traveling lane plan, the map information, the current location of the vehicle 10, the surrounding environment information and the vehicle status information. The driving plan is represented as a combination of the target location of the vehicle 10 and the target vehicle speed at the target location, at each time from the current time until the predetermined time. The cycle in which the driving plan is created is preferably shorter than the cycle in which the traveling lane plan is created. When the traveling lane plan includes a lane change wherein the vehicle 10 is to move between traffic lanes, the drive planning device 16 creates a driving plan that includes the lane change, in such a manner that a spacing of at least a predetermined distance can be maintained between the vehicle 10 and other vehicles. When the traveling lane plan includes a lane change wherein the vehicle 10 is to move between lanes, but a spacing of at least a predetermined distance cannot be ensured between the vehicle 10 and another vehicle, the drive planning device 16 generates a driving plan for stopping the vehicle 10. The drive planning device 16 outputs the driving plan to the vehicle control device 17 for each driving plan generated.

The vehicle control device 17 controls each unit of the vehicle 10 based on the current location of the vehicle 10 and the vehicle speed and yaw rate, as well as on the driving plan generated by the drive planning device 16, so that the vehicle 10 travels along the navigation route R. For example, the vehicle control device 17 determines the steering angle, acceleration and angular acceleration of the vehicle 10 according to the driving plan and the speed and yaw rate of the vehicle 10, and sets the amount of steering, and the accelerator or brake level so as to match that steering angle, acceleration and angular acceleration. The vehicle control device 17 also outputs a control signal corresponding to a set steering amount, to an actuator (not shown) that controls the steering wheel for the vehicle 10, via the in-vehicle network 18. The vehicle control device 17 also determines the amount of fuel injection according to a set accelerator level, and outputs a control signal corresponding to the amount of fuel injection to a drive unit (not shown) of the engine of the vehicle 10, via the in-vehicle network 18. Alternatively, the vehicle control device 17 may output a control signal corresponding to a set brake level to the brake (not shown) of the vehicle 10, via the in-vehicle network 18.

The vehicle control device 17 has an automatic control operating mode in which the vehicle 10 is operated by automatic control, and a manual control operating mode in which the driver operates the vehicle manually. When automatic control operating mode has been applied, the vehicle control device 17 enables automatic control of vehicle operation including driving, braking and steering. When the driver has acknowledged the control change notification that change from automatic control to manual control is required, the vehicle control device 17 in automatic control operating mode switches operation of the vehicle 10 from the currently applied automatic control operating mode to manual control operating mode. Therefore when the vehicle 10 cannot safely travel by automatic control, the driver can use the steering wheel, accelerator pedal and brake pedal (not shown) for traveling by manually controlled operation of the vehicle. In manual control operating mode, at least one operation of the vehicle 10 from among driving, braking and steering is controlled manually. A change from automatic control to manual control is possible, depending on the request by the driver.

For FIG. 2, the map information storage device 11, map information assessment device 12, location estimating device 13, object detector 14, traveling lane planning device 15, drive planning device 16 and vehicle control device 17 were explained as separate devices, but all or some of them may be constructed in a single device.

Figure 3:
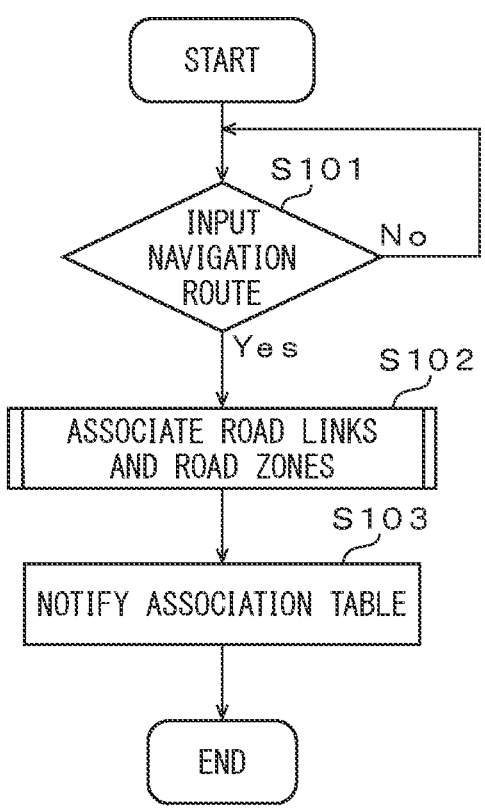
FIG. 3 is an operation flow chart (1) for association processing by a vehicle control system of the embodiment.

FIG. 3 shows an example of an operation flow chart relating to association processing by the map information storage device 11 in the vehicle control system 1. Association processing by the map information storage device 11 will now be explained with reference to FIG. 3. The map information storage device 11 carries out association processing according to the operation flow chart shown in FIG. 3, each time a new navigation route is generated.

First, the map information storage device 11 of the vehicle control system 1 determines whether or not a new navigation route R has been input from the navigation device 4 (step S101).

Figure 4:
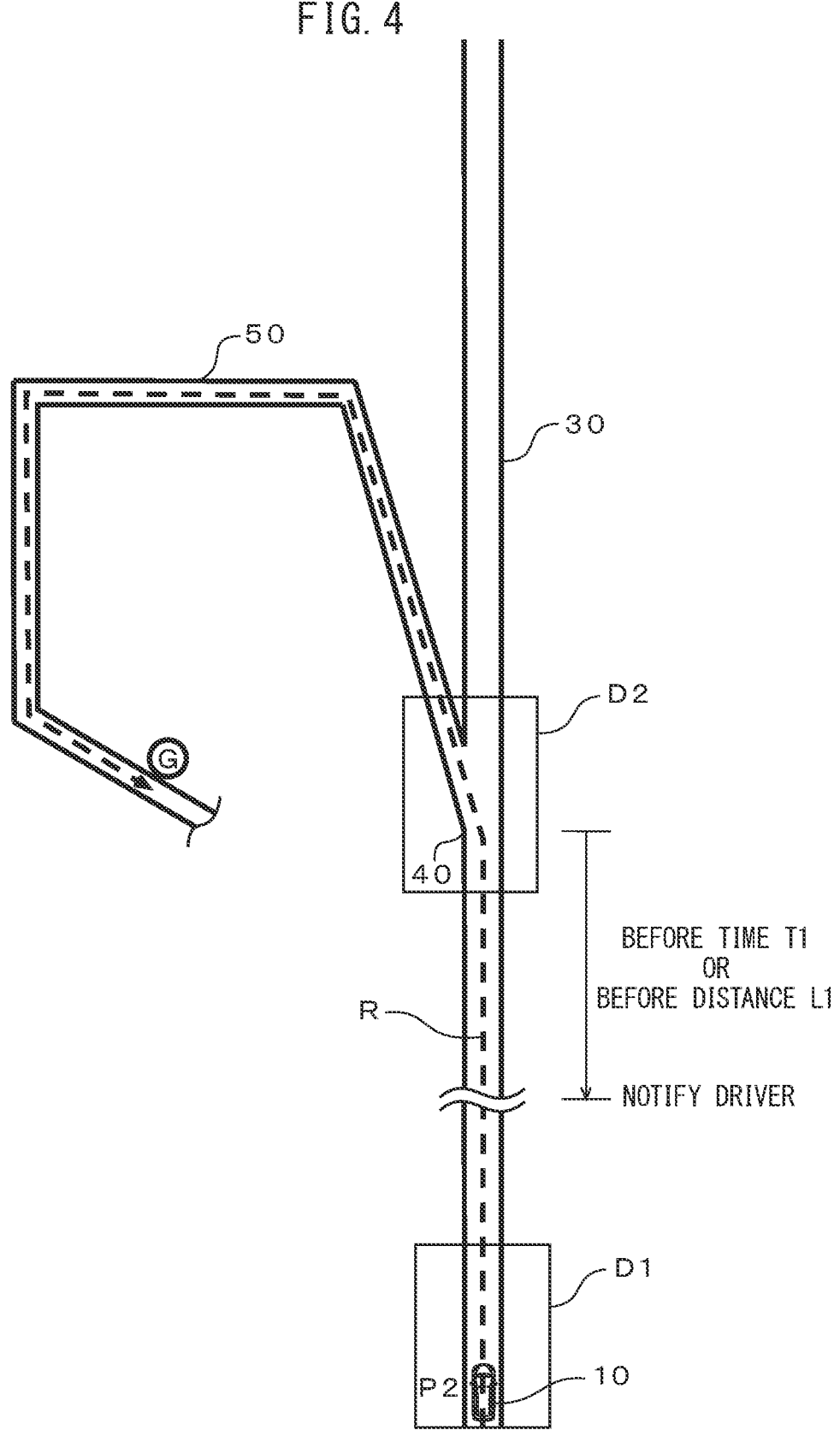
FIG. 4 is a diagram showing an example of a navigation route.

FIG. 4 shows an example of a navigation route R input from the navigation device 4. When a destination location has been newly set, or when the current location of the vehicle 10 has deviated from the navigation route, the navigation device 4 refers to the navigation map and generates a navigation route R, based on the current location P2 of the vehicle 10 and the destination location G. The navigation route R represents a scenario in which the vehicle 10 travels on the road 30 and then exits to the road 50 at the branching location 40, and travels on the road 50 to reach the destination location G.

When a navigation route R has been input (step S101—Yes), the map information storage device 11 associates corresponding road zones in the location-estimating map for each of the multiple road links representing the navigation route R from the current location P2 of the vehicle 10 to the destination location G (step S102). The map information storage device 11 also generates an association table representing association between the road zones and the road links representing the navigation route R from the current location P2 of the vehicle 10 to the destination location G.

Processing in step S102 will now be explained with reference to FIG. 5. When a new navigation route R has not been input (step S101—No), processing returns to the start of step S101.

The map information storage device 11 next notifies the location-estimating map, as well as the map information assessment device 12, location estimating device 13, object detector 14, traveling lane planning device 15, drive planning device 16 and vehicle control device 17, of the association table generated in step S102 (Step S103) and the series of the processing is completed.

Figure 5:
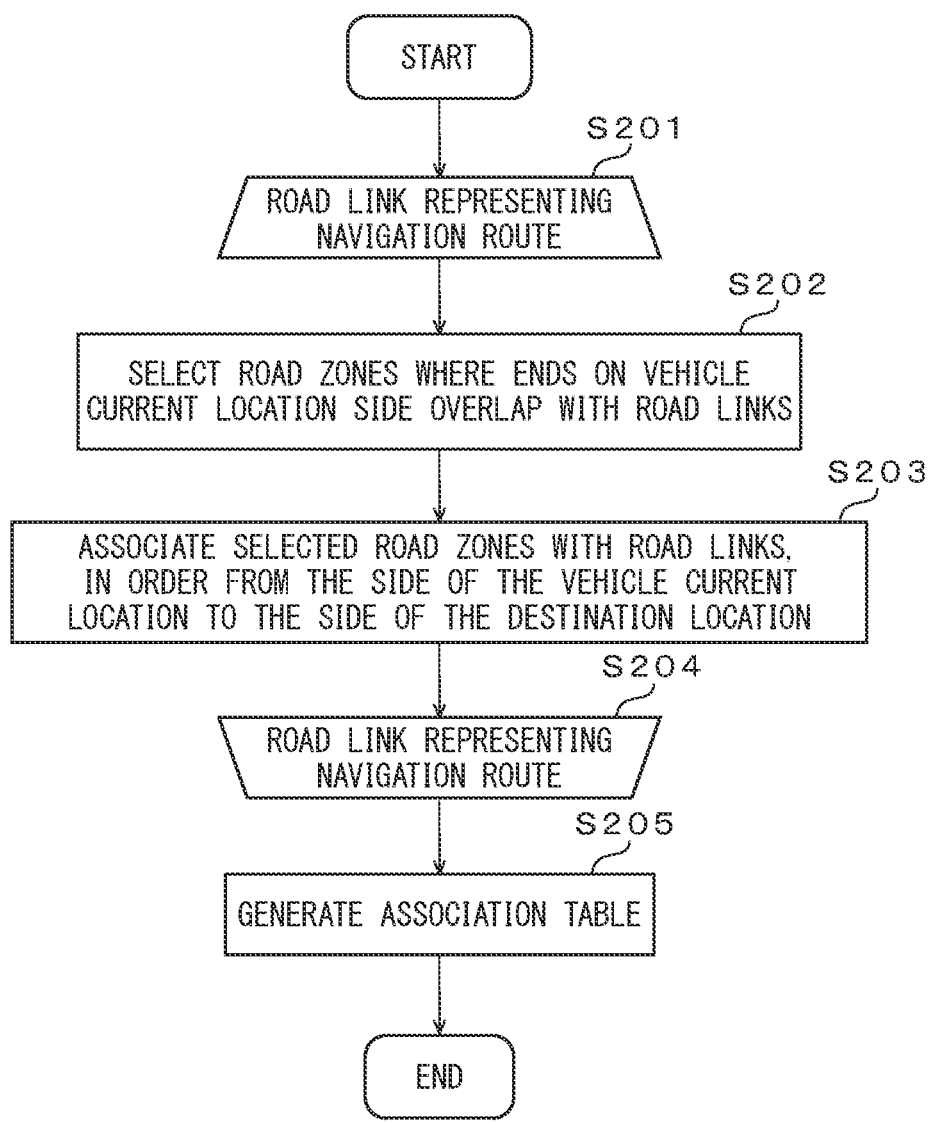
FIG. 5 is an operation flow chart (2) for association processing by a vehicle control system of the embodiment.

FIG. 5 is an operation flow chart for processing by the map information storage device 11 in which road zones are associated for each of the road links representing the navigation route R in step S102.

In the example shown in FIG. 4, the map information storage device 11 carries out processing from step S201 to step S204 for each of the multiple road links representing the navigation route R from the current location P2 of the vehicle 10 to the destination location G.

First, the map information storage device 11 refers to the navigation route R, selects the first road link that contains the current location P2 of the vehicle 10, and selects one or multiple road zones where the ends on the side of the current location of the vehicle 10 overlap with the area from the current location P2 of the vehicle 10 to the end point of the road link (step S202). The length of one road link will generally be longer than that of one road zone.

Figure 6:
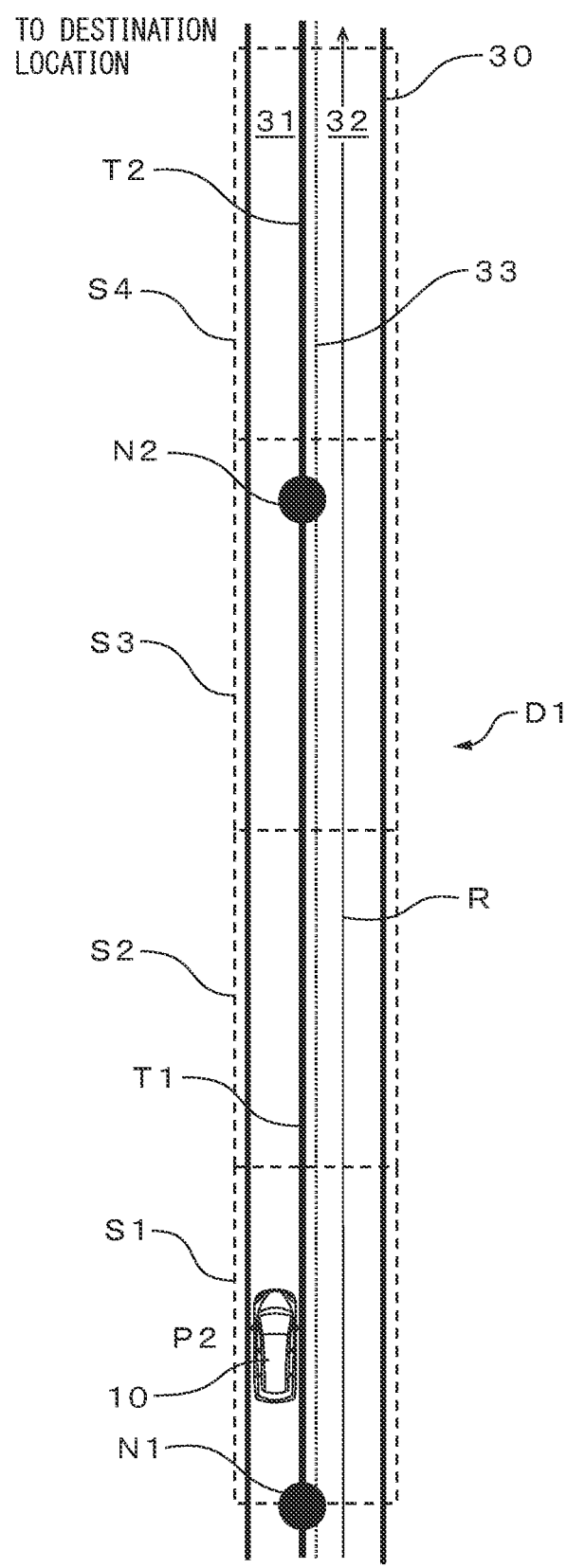
FIG. 6 is a diagram illustrating association processing by a vehicle control system (1).

FIG. 6 is a diagram illustrating processing by which the map information storage device 11 associates road links and road zones in zone D1 of the navigation route R (see FIG. 4). Similar to the example shown in FIG. 1, the vehicle 10 travels on the traffic lane 31 of the road 30 which has two traffic lanes 31 and 32. The traffic lane 31 and traffic lane 32 are divided by a lane marking line 33. The zone D1 of the navigation route R is represented by a road link T1 representing the road 30, a road link T2 representing the road 30, and a node N2. The road link T1 extends from the node N1, and the road link T1 and road link T2 are connected via the node N2. In the association processing, the road link T1 containing the current location P2 of the vehicle 10 is selected first. The road zone S1, the road zone S2 and the road zone S3 are selected as road zones where the ends on the side of the current location of the vehicle 10 overlap with the area from the current location P2 of the vehicle 10 up to the end point of the road link T1.

Next, the map information storage device 11 associates each of the selected road zones S1, S2 and S3 with the road link T1 in order from the side of the current location of the vehicle 10 to the destination location side (step S203). In the example shown in FIG. 6, the road zone S1, the road zone S2 and the road zone S3 are associated in that order with the road link T1.

For the remaining road links representing the navigation route R, the map information storage device 11 repeats the processing of step S202 and step S203 and associates the road zones for each of the road links representing the navigation route R. In the example shown in FIG. 6, the road zone S4 is further associated with the road link T2 in the zone D1 of the navigation route R.

Figure 7:
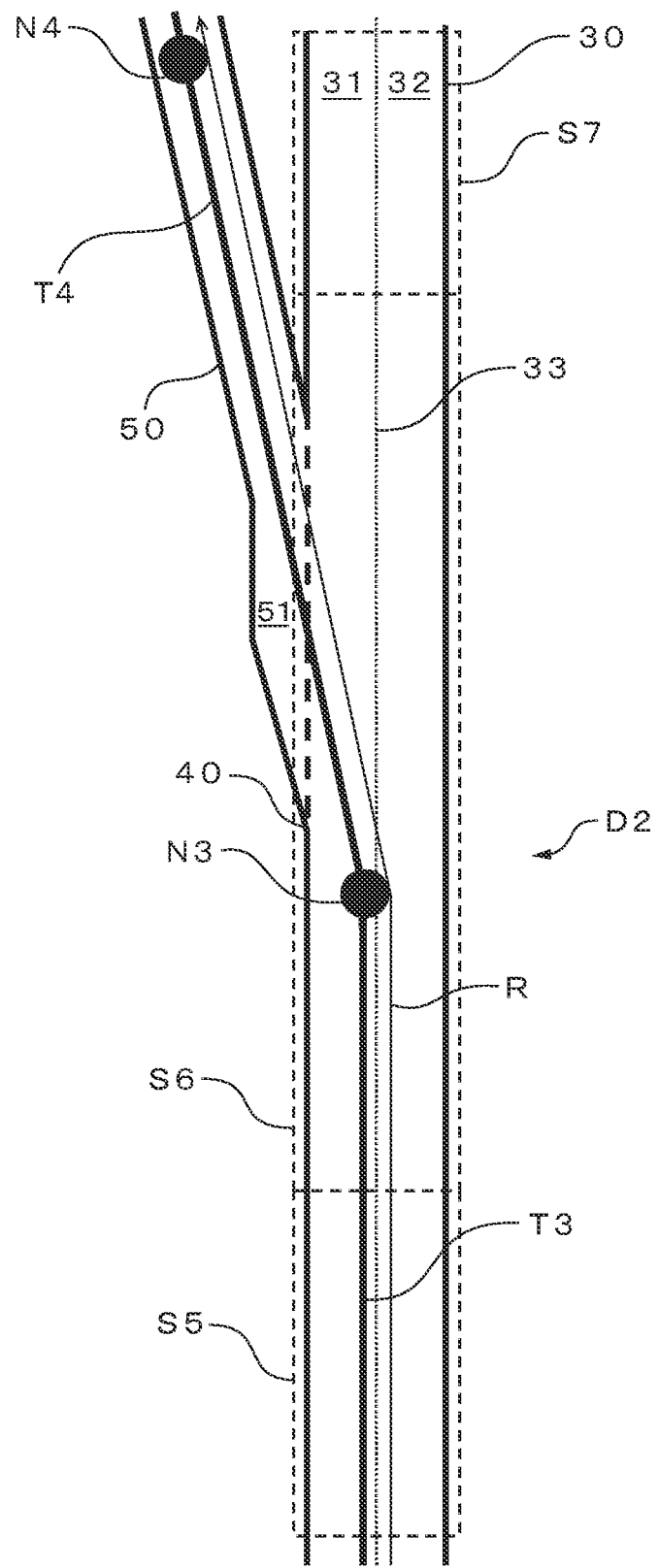
FIG. 7 is a diagram illustrating association processing by a vehicle control system (2).

FIG. 7 is a diagram illustrating processing by which the map information storage device 11 associates road links and road zones in zone D2 of the navigation route R (see FIG. 5). FIG. 7 corresponds to FIG. 1. The zone D2 of the navigation route R is represented by a road link T3 representing the road 30, a road link T4 representing the road 50, and a node N3. The road link T3 representing the road 30 is connected with the road link T4 representing the road 50 via the node N3. First, the road zones S5, S6 having ends overlapping with the road link T3 representing the navigation route R on the side of the current location of the vehicle 10 are associated with the road link T3. In the example shown in FIG. 7, the road zone S5 and the road zone S6 are associated in that order with the road link T3. Since the road link T4 representing the road 50 in the navigation route R does not include a road zone with an end overlapping on the side of the current location of the vehicle 10 in the location-estimating map, no road zone is associated with the road link T4. The road link T3 is the last road link on the destination location G side of the navigation route R.

When the map information storage device 11 executes the processing of step S202 and step S203 for the last road link T3 on the destination location G side of the navigation route R, it generates an association table representing association between the road zones and the road links representing the navigation route R from the current location P2 of the vehicle 10 to the destination location G (step S205). An association table is newly generated each time a navigation route R is generated.

Figure 8:
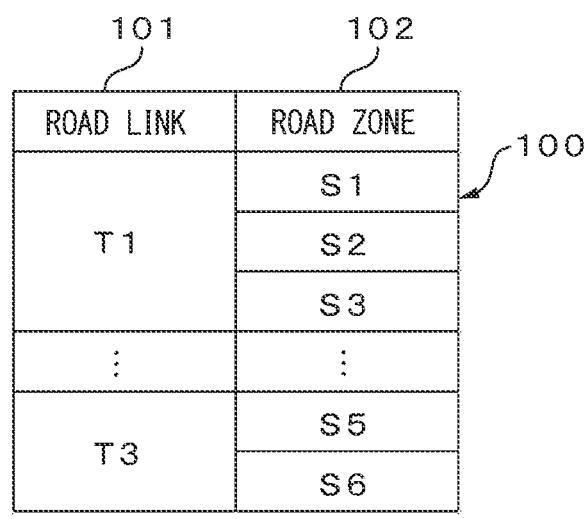
FIG. 8 is a diagram showing an association table.

FIG. 8 is a diagram showing an example of an association table. The association table 100 has a road link column 101 in which the road links are registered, and a road zone column 102 in which the road zones associated with the road links are registered. In the association table 100, the road zone S1, the road zone S2 and the road zone S3 are associated in that order with the road link T1 representing the navigation route R. The road zone S5 and road zone S6 are also associated in that order with the road link T3 representing the navigation route R in the association table 100. In the road zone column 101, the current location P2 of the vehicle 10, at the point when the navigation route R was generated, is included in the initially registered road zone T1. The last road zone S6 registered in the road zone column 101 represents the final road zone associated with the navigation route R. This last road zone may include the destination location of the vehicle 10, or it may include a border of the location-estimating map. In either case, the last road zone is the road zone in the location-estimating map where automatic control stops. This concludes explanation of association processing.

Figure 9:
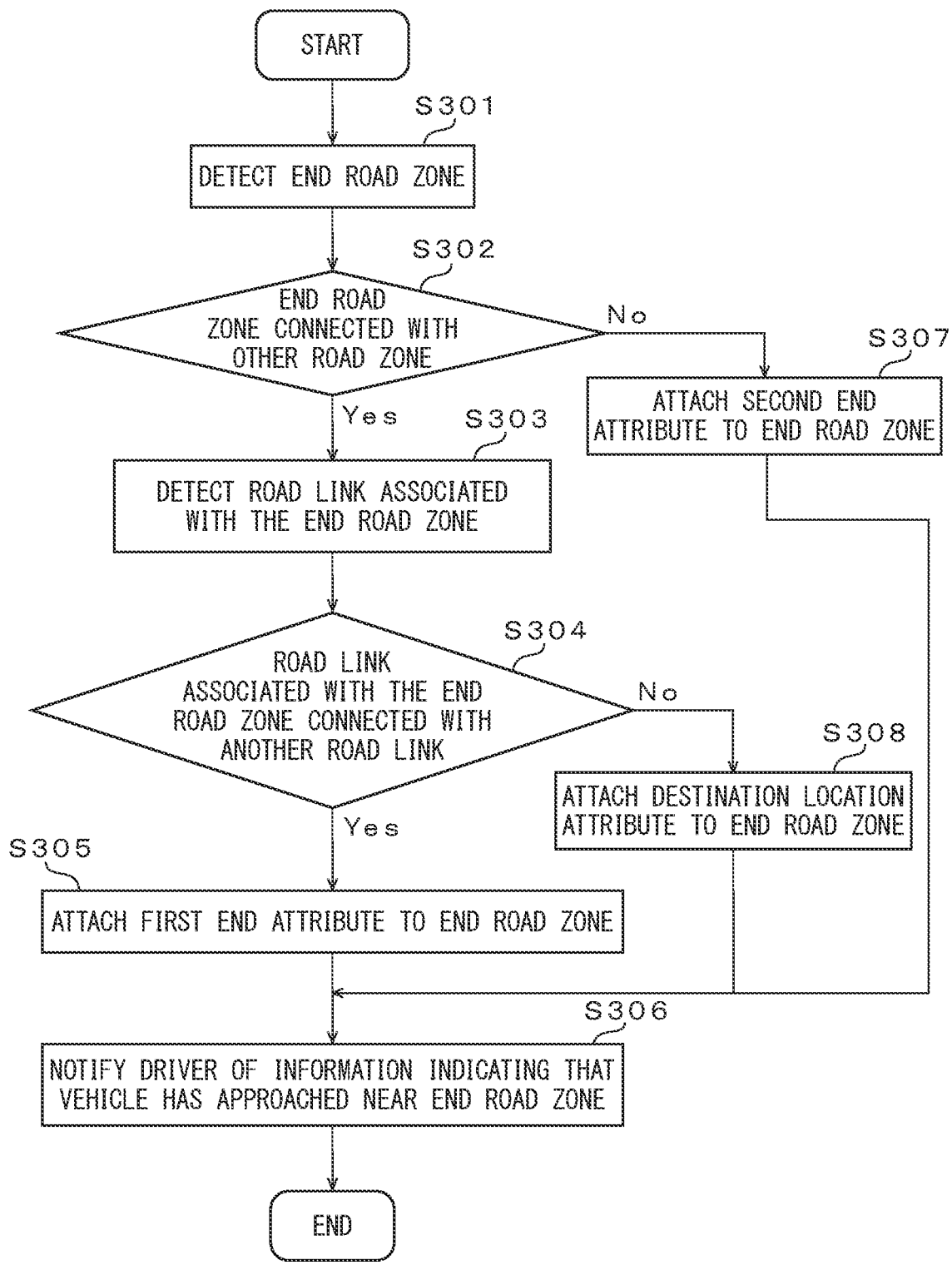
FIG. 9 is an operation flow chart for map information assessment processing by a vehicle control system of the embodiment.

FIG. 9 is an operation flow chart for map information assessment processing by the map information assessment device 12 of the vehicle control system 1 of the embodiment. After association processing by the map information storage device 11 has been completed, the map information assessment device 12 carries out map information assessment processing according to the operation flow chart shown in FIG. 9.

First, the road zone detecting unit 231 of the processor 23 in the map information assessment device 12 detects the end road zone that is located furthest on the destination location side, among multiple road zones on the navigation route R (step S301). The road zone detecting unit 231 refers to the association table 100 shown in FIG. 8 and detects the road zone S6 as the end road zone. The road zone detecting unit 231 notifies the first assessment unit 232 of the end road zone S6.

Next, the first assessment unit 232 of the processor 23 in the map information assessment device 12 refers to the location-estimating map and determines whether or not the end road zone S6 is connected with another road zone on the destination location side (step S302).

In the example shown in FIG. 7, the end road zone S6 is connected to the other road zone S7 on the destination location side (step S302—Yes), and therefore the road link detecting unit 233 of the processor 23 in the map information assessment device 12 refers to the association table 100 and detects the end road link T3 on the navigation route R that is associated with the end road zone S6 (step S303).

The second assessment unit 234 of the processor 23 in the map information assessment device 12 then determines whether or not the end road link T3 is connected with another road link representing the navigation route R, which is not associated with the road zone on the destination location side (step S304).

In the example shown in FIG. 7, the end road link T3 is connected via the node N3 to the other road link T4 representing the navigation route R, which is not associated with the road zone on the destination location side (step S304—Yes), and therefore the attribute attaching unit 235 of the processor 23 in the map information assessment device 12 attaches a first end attribute to the end road zone S6 (step S306). For this embodiment, the first end attribute indicates that the end road zone S6 is the last road zone where automatic control is possible for traveling of the vehicle 10 along the navigation route R, and that a road toward the destination location branches.

When a first end attribute has been attached to the end road zone S6, and the vehicle 10 traveling along the navigation route R has approached within a first distance (for example, 100 m to 500 m) to the end road zone S6 which has the first end attribute attached, the notification control unit 236 of the processor 23 in the map information assessment device 12 notifies the driver via the UI 5 of first information indicating that the vehicle 10 has approached within the first distance (indicated by distance L1 in FIG. 4) to the end road zone S6 and that the road toward the destination location branches. For example, the notification control unit 236 displays on the display device 5a information indicating that operation of the vehicle 10 by automatic control will end and that the road toward the destination location branches. In response, the vehicle control device 17 or the driver transfers operation of the vehicle 10 from automatic control to manual control. At the branching location 40, the driver can then move the vehicle 10 from the traffic lane 31 of the road 30 to the traffic lane 51 of the road 50, in order to drive toward the destination location G. Instead of the first distance, a first time may be calculated based on the most recent average speed of the vehicle 10 and the first distance (indicated as time T1 in FIG. 4), and the driver may be notified via the UI 5 of the first information at a time that is the period of the first time before the arrival time at which it is estimated to arrive at the end road zone S6.

When the end road zone S6 is not connected with the other road zone S7 representing the navigation route R on the destination location side (step S302—No), it means that the end road zone S6 includes a border on the location-estimating map. The attribute attaching unit 235 of the vehicle control system 1 attaches a second end attribute to the end road zone S6 (step S307). For this embodiment, the second end attribute indicates that the end road zone S6 is part of the road toward the destination location, but that it is the last road zone where automatic control is possible.

When the second end attribute has been attached to the end road zone S6, and the vehicle 10 traveling along the navigation route R has approached within a second distance (for example, 100 m to 500 m) to the end road zone S6 which has the second end attribute attached, the notification control unit 236 notifies the driver via the UI 5 of second information indicating that it is part of the road to the destination location but that driving of the vehicle 10 by automatic control is to be ended (step S306). For example, the notification control unit 236 displays on the display device 5a information indicating that the vehicle is traveling on a road toward the destination location, but that driving of the vehicle 10 by automatic control is to end soon. In response, the vehicle control device 17 or the driver transfers operation of the vehicle 10 from automatic control to manual control. The driver may also continue driving the vehicle 10 on the road 30 at the branching location 40.

Figure 10:
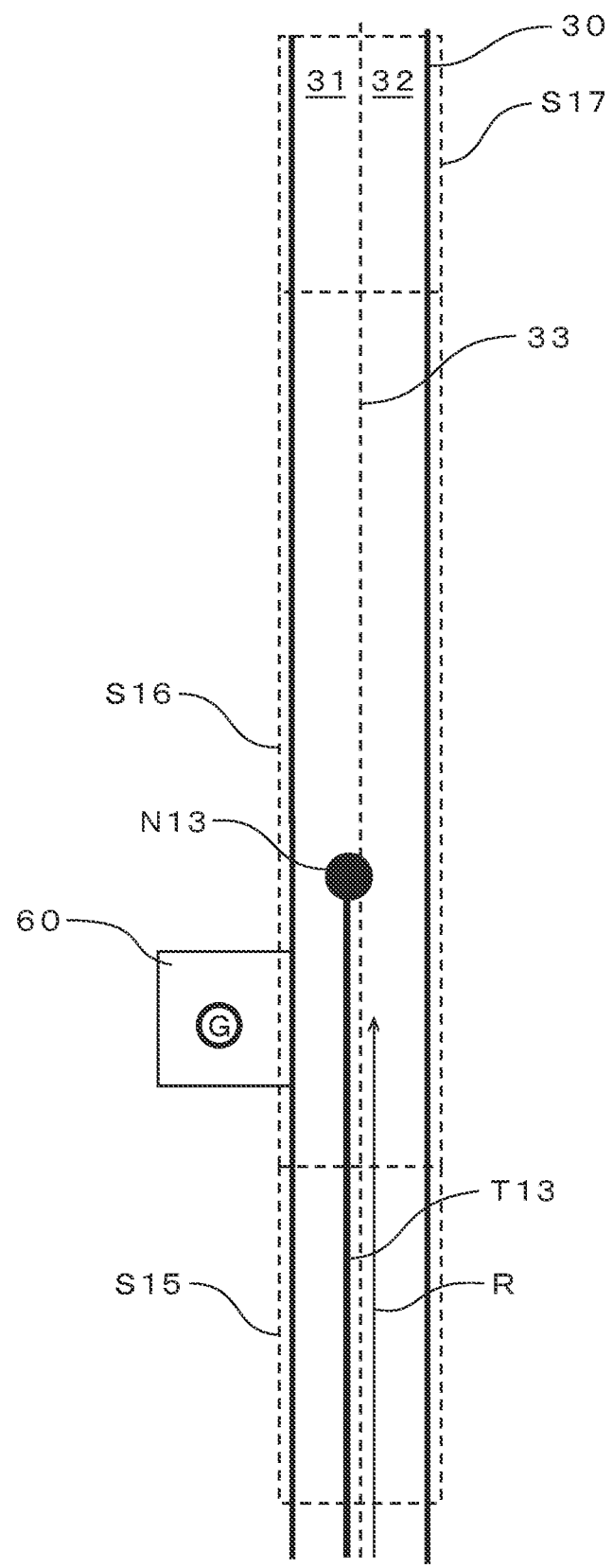
FIG. 10 is a diagram illustrating map information assessment processing by a vehicle control system.

When the end road link T3 is not connected to another road link representing the navigation route R which is not associated with the road zone on the destination location side (step S304—No), this means that the navigation route R ends at the end road link. In other words, the end road link includes the destination location of the vehicle 10. FIG. 10 shows an example in which the end road link T13 is not connected with another road link representing the navigation route R, which is not associated with the road zone on the destination location side. The end road link T13 representing the navigation route R is associated with the road zone S15 and the road zone S16. The end road link T13 is connected with the node N13. No road link representing the navigation route R exists ahead from the node N13. A service area 60, which is the destination location G of the vehicle 10, is connected with the end road link T13.

When the end road link T13 is not connected with another road link representing the navigation route R, the attribute attaching unit 235 attaches a destination location attribute to the end road zone S16, indicating that the end road zone S16 includes the destination location of the vehicle (step S308). When the vehicle 10 traveling along the navigation route R has approached within a third distance (for example, 100 m to 500 m) to the end road zone S16 which has the destination location attribute attached, the notification control unit 236 notifies the driver via the UI 5 of information indicating that the vehicle 10 has approached near to the destination location G (step S306). The vehicle control system 1 drives the vehicle 10 by automatic control to move to the service area 60.

As explained above, the map information assessment device associates information for multiple road links representing a vehicle navigation route that has been generated on a navigation map based on the current location and destination location of a vehicle, with information for multiple road zones representing roads represented in a location-estimating map used for estimating the location of the vehicle. The map information assessment device also detects the end road zone located furthest on the destination location side, among the multiple road zones on the navigation route, determines whether or not the end road zone is connected to another road zone on the destination location side, detects the end road link on the navigation route which is associated with the end road zone when the end road zone is connected with another road zone on the destination location side, and determines whether or not the end road link is connected with another road link representing the navigation route, which is not associated with the road zone on the destination location side. When the end road link is connected with another road link representing the navigation route, the map information assessment device attaches a predetermined attribute to the end road zone. This allows the map information assessment device to recognize branching locations even when a navigation route in a navigation map branches from a road in the location-estimating map to another road not in the location-estimating map, by attaching a predetermined attribute to an end road zone among multiple road zones representing roads in the location-estimating map.

The map information assessment device, computer program for map information assessment, medium storing the computer program for map information assessment and map information assessment method of the embodiment described above relating to the present disclosure may incorporate appropriate modifications that are still within the gist of the invention. Moreover, the technical scope of the disclosure is not limited to these embodiments, and includes the invention and its equivalents as laid out in the Claims.

The invention claimed is:

1. A map information assessment device capable of executing associative processing between information for multiple road links representing a vehicle navigation route that has been generated on a navigation map based on a current location and destination location of a vehicle, and information for multiple road zones representing roads represented in a location-estimating map used for estimating a location of the vehicle, the map information assessment device comprising:
a memory storing a program; and
a processor configured to execute the program to:
detect an end road zone located furthest on the destination location side among the multiple road zones on the navigation route;
determine whether or not the end road zone is connected with another road zone on the destination location side;
detect an end road link on the navigation route that is associated with the end road zone when the end road zone is connected with another road zone on the destination location side,
determine whether or not the end road link is connected with another road link representing the navigation route that is not associated with the road zone on the destination location side;
attach a predetermined attribute to the end road zone when the end road link is connected with another road link representing the navigation route; and
give the driver a notification, using a liquid crystal display or a touch panel, of information indicating that the vehicle has approached within a predetermined distance of the end road zone having the attached predetermined attribute, when the vehicle has approached within the predetermined distance to the end road zone,
wherein the notification includes indicating that operation of the vehicle by automatic control will end and operation of the vehicle will be changed from automatic control to manual control.

2. The map information assessment device according to claim 1, wherein the predetermined attribute indicates that the end road zone is the last road zone where the location of the vehicle can be estimated using the location-estimating map, for traveling of the vehicle along the navigation route.

3. The map information assessment device according to claim 1, wherein the processor is further configured to attach an attribute to the end road zone indicating that the end road zone includes the destination location of the vehicle, when the end road link is not connected with another road link.

4. A computer-readable, non-transitory medium storing a computer program for map information assessment which is capable of executing associative processing between information for multiple road links representing a vehicle navigation route that has been generated on a navigation map based on a current location and destination location of a vehicle, and information for multiple road zones representing roads represented in a location-estimating map used for estimating a location of the vehicle, wherein the computer program for map information assessment causes a processor to execute a process, the process comprising:
detecting an end road zone located furthest on the destination location side among the multiple road zones on the navigation route;
determining whether or not the end road zone is connected with another road zone on the destination location side;
detecting an end road link on the navigation route that is associated with the end road zone when the end road zone is connected with another road zone on the destination location side;
determining whether or not the end road link is connected with another road link representing the navigation route that is not associated with the road zone on the destination location side;
attaching a predetermined attribute to the end road zone when the end road link is connected with another road link representing the navigation route; and
giving the driver a notification, using a liquid crystal display or a touch panel, information indicating that the vehicle has approached within a predetermined distance of the end road zone having the attached predetermined attribute, when the vehicle has approached within the predetermined distance to the end road zone,
wherein the notification includes indicating that operation of the vehicle by automatic control will end and operation of the vehicle will be changed from automatic control to manual control.

5. A map information assessment method which allows associative processing between information for multiple road links representing a vehicle navigation route that has been generated on a navigation map based on a current location and destination location of a vehicle, and information for multiple road zones representing roads represented in a location-estimating map used for estimating a location of the vehicle, the map information assessment method being carried out by a map information assessment device and the method comprising:
detecting an end road zone located furthest on the destination location side among the multiple road zones on the navigation route;
determining whether or not the end road zone is connected with another road zone on the destination location side;
detecting an end road link on the navigation route that is associated with the end road zone when the end road zone is connected with another road zone on the destination location side;
determining whether or not the end road link is connected with another road link representing the navigation route that is not associated with the road zone on the destination location side;
attaching a predetermined attribute to the end road zone when the end road link is connected with another road link representing the navigation route; and
giving the driver a notification, using a liquid crystal display or a touch panel, of information indicating that the vehicle has approached within a predetermined distance of the end road zone having the attached predetermined attribute, when the vehicle has approached within the predetermined distance to the end road zone,
wherein the notification includes indicating that operation of the vehicle by automatic control will end and operation of the vehicle will be changed from automatic control to manual control.

* * * * *